Jan. 30, 1968 P. J. MAZZIOTTI 3,365,986
PLANETARY GEAR AXLE OUTER END
Filed May 6, 1965 2 Sheets-Sheet 2

INVENTOR.
PHILIP J. MAZZIOTTI
BY
ATTORNEYS

United States Patent Office 3,365,986
Patented Jan. 30, 1968

3,365,986
PLANETARY GEAR AXLE OUTER END
Philip J. Mazziotti, Toledo, Ohio, assignor to Dana Corporation, Toledo, Ohio, a corporation of Virginia
Filed May 6, 1965, Ser. No. 453,630
12 Claims. (Cl. 74—801)

ABSTRACT OF THE DISCLOSURE

A driving axle apparatus wherein an axle shaft is rotatably mounted in an axle housing, the driven wheel hub surrounds the outer end of the axle housing and is rotatably mounted thereon and a planetary reduction gear set drivingly connects the axle shaft to the housing. The axle shaft is mounted so that the outer end thereof can move a limited amount both axially and radially of the axle housing. The gear set includes a driving sun gear mounted on the axle shaft for unitary rotation while being axially movable relative thereto, a ring gear secured to the axle housing and driven planetary gears. The planet gear carrier has peripheral splines thereon which are splined to internal splines on the wheel hub. These splines are proportioned so that the connection therebetween allows relative radial float and axial movement, and combinations thereof, to take place between the carrier and the wheel hub.

---

This invention relates to improvements in vehicle driving axles and particularly to improvements in planetary gear axle outer ends.

The use of a planetary gear arrangement in an axle outer end is well known and has been utilized in many arrangements to provide for a gear reduction drive between the axle shaft and the driven wheel. One such arrangement is shown in United States Patent 3,150,532, wherein the sun gear of a planetary gear set is driven by the axle shaft and drives the planet carrier at a reduced ratio, the latter being drivingly connected to the driven wheel hub. The ring gear of this gear set is mounted against rotation and for radial float relative to the planet gears to accommodate tolerance variations and the like. Another construction of a planetary axle outer end is shown in United States Patent 2,763,160, wherein the drive to the wheel hub is taken from the internally toothed ring gear and the planet carrier is floatingly connected to the wheel spindle for limited radial floating movement while being fixed against rotation.

However, it should be noted, in the above mentioned patents and in the many various other prior art devices, that the driving connection between the one portion of the planetary gear arrangement and the driven wheel hub is fixed in nature, so that not only is that one portion unable to float either radially or axially relative to the remaining portions of the planetary gear set but, also, radial and axial movement of the wheel hub will impose similar movement to the one portion connected thereto and thus tend to interfere with the operation of a planetary gear set.

It is therefore an object of this invention to provide a new and improved planetary gear axle outer end.

It is another object of this invention to provide a planetary gear axle outer end wherein the one portion of the planetary which is drivingly connected to the wheel hub is adapted for movement relative thereto.

It is also an object of this invention to provide such an outer end wherein said one portion of the planetary is floatable both axially and radially relative to the wheel hub.

Yet another object of this invention is to provide a planetary gear axle outer end for driving the wheel hub at a ratio with respect to the axle shaft and wherein the driving connection between the wheel hub and the planetary gear set is of a splined variety and adapted to accommodate relative radial and axial movement between the wheel hub and the planetary gear set.

It is yet another object of this invention to provide such a planetary gear axle outer end wherein the sun gear is also adapted for radial and axial movement relative to the wheel hub.

Figure 1:
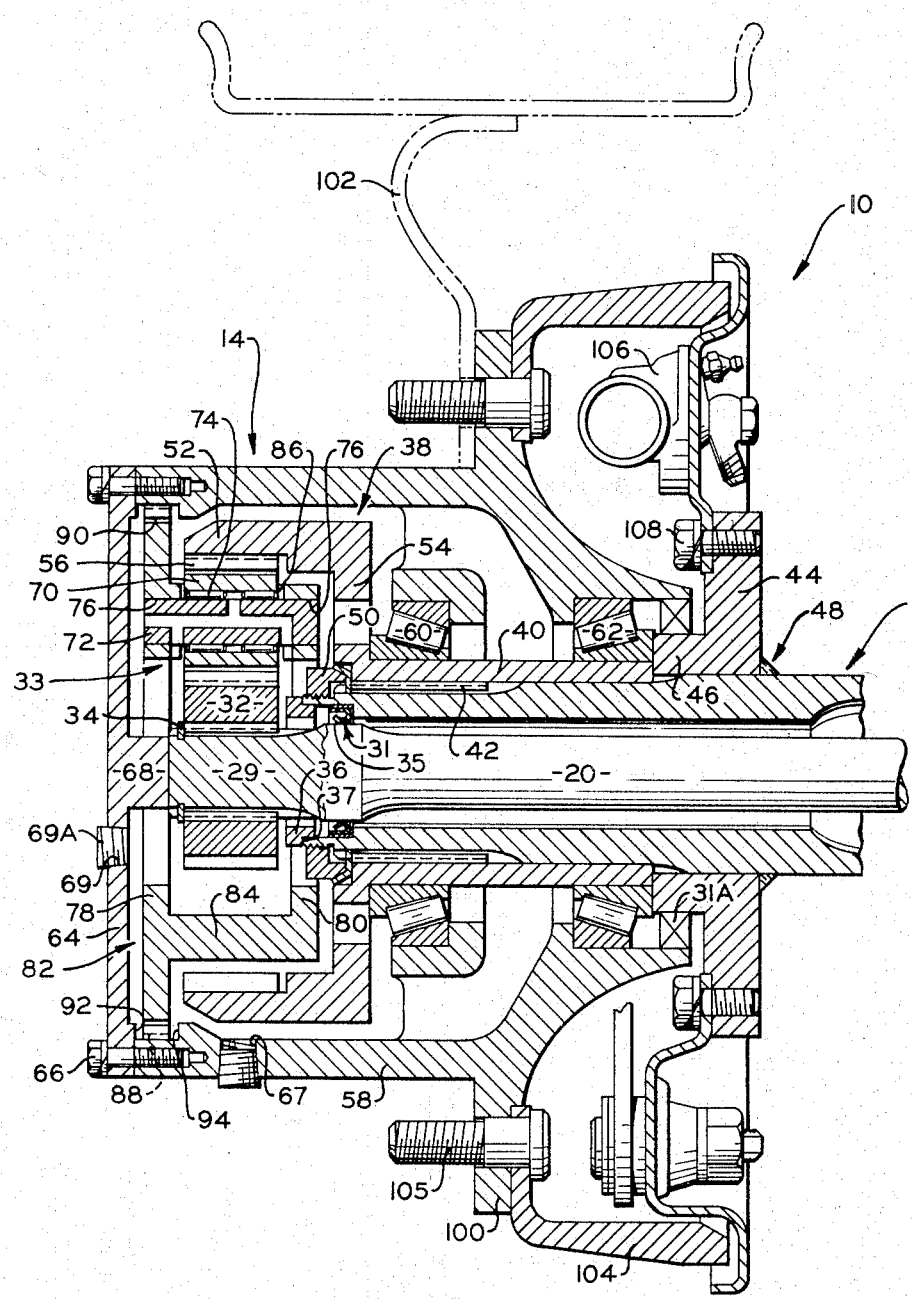
Figure 2:
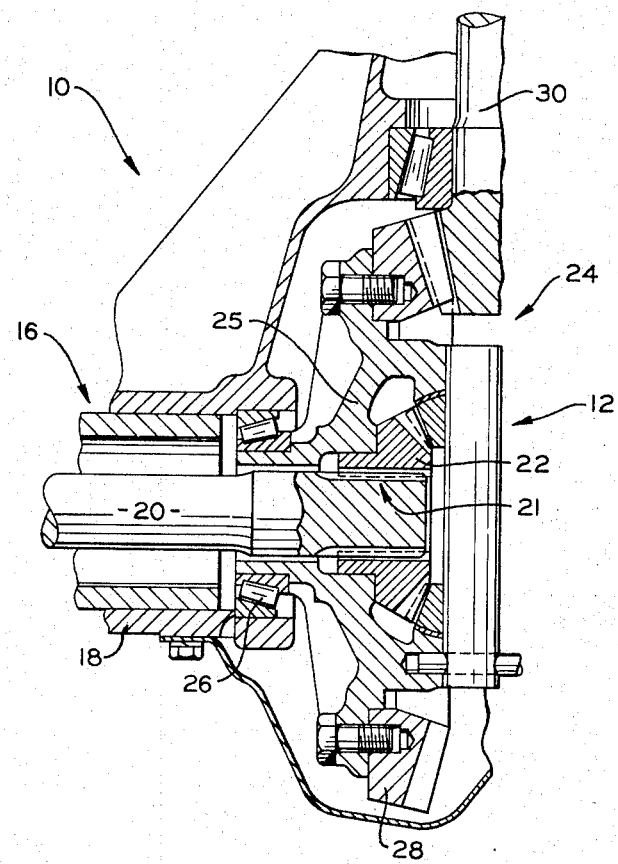

Further and other objects of this invention will become apparent from the following description when considered in connection with the accompanying drawings, wherein:

FIG. 1 is a sectional view of a planetary gear axle outer end incorporating this invention; and FIG. 2 is a sectional view of a portion of a differential transmission utilized with the planetary gear axle outer end shown in FIG. 1.

Referring to the drawings, an axle assembly, only one-half of which is shown in FIGS. 1 and 2 by the numeral 10, includes a differential transmission portion shown fragmentarily at 12, a planetary gear axle outer end assembly 14 at each outboard end thereof, and a tube-like axle shaft housing 16; the housing 16 being secured to the housing 18 of the differential transmission 12 and surrounds an axle shaft 20. The axle shaft 20 is splined as at 21 to a side gear 22 of a differential gear train shown generally at 24; the latter being driven by a differential case 25 rotatably mounted in the housing 18 by means of bearings 26. The case 25 conventionally mounts a ring gear 28 which is driven by a pinion shaft 30 powered in a conventional manner. The spline connection 21 mounts the axle shaft 20 in the associated side gear 22 for unitary rotation and allows the axle shaft to move axially relative to the side gear.

Mounted on the outer end of the axle shaft housing 16 is the planetary gear axle outer end assembly 14. More particularly, the outer end 29 of the axle shaft 20 projects from the outer end of the housing 16 and mounts thereon for unitary rotation and relative axial movement a sun gear 32 of a planetary gear set 33. The axially outer face of the sun gear 32 abuts a snap ring 34 conventionally secured in a groove formed in the end 29 of the axle shaft 20 to the left of the sun gear, which snap ring, when engaged by the sun gear, inhibits the sun gear from moving to the left relative to the axle shaft and inhibits the axle shaft from moving to the right relative to the sun gear; however, the sun gear can move along the shaft 20 a limited amount to the right from its position wherein it abuts the snap ring 34. The right side of the sun gear is spaced from and axially movable a limited amount relative to an annular thrust block 36, preferably made of low friction material such as brass, the block being radially spaced from the axle shaft 20 and pressed into the housing 16 until a shoulder 37 formed thereon engages the outer end of the housing 16. Accordingly, movement of the sun gear 32 toward the housing 16 is limited by the engagement of the sun gear 32 with the block 36, and movement of the axle shaft 20 inwardly with respect to the housing 16 is inhibited by the engagement of the snap ring 34 with the outer end of the sun gear 32 when the latter engages the thrust block.

A lip seal 31 has a peripheral metallic portion 33 pressingly disposed in the bore of the housing 16 and radially spaced from the axle shaft 20. An elastomeric portion 35 of the seal 31 is annular in form, bonded to the metallic portion 33 and engages the periphery of the shaft 20 so that the seal 31 will accommodate relative radial and axial movement of the shaft 20 relative to the housing 16 by deflection of the elastomeric portion 35. Actually, it is preferred that the seal forms the sole direct connection between the shaft 20 and housing 16.

A bell shaped member 38 includes a hub portion 40 which is disposed about the housing 16 adjacent the outer end thereof and splined against relative rotation to the periphery of the housing 16 as shown generally at 42. An annular flanged member 44 having an outwardly facing hub 46 is secured to the housing 16, as by a weld shown generally at 48, immediately inboard of the hub 40 and abuttingly engages the same thereby inhibiting inward movement of the bell shaped member 38 relative to the housing 16. An annular abutting block 50 is threaded on the outer end of the housing 16 and abuts the outer end of the hub 40 thereby securing the bell shaped member 38 from moving outwardly relative to the housing. The member 38 also includes an annular portion 52 secured to the hub 40 by an annular flange 54, which portion 52 has an internally toothed portion or ring gear 56 formed coaxially with the housing 16.

Surrounding the bell shaped member 38 is an annular wheel hub 58, which hub is mounted for rotation on the housing 16 by a pair of axially spaced tapered roller bearing assemblies 60 and 62 disposed between the wheel hub 58 and the hub 40 of the bell shaped member 38. The wheel hub 58 is provided with a hub end cover 64 which covers the left open end of the hub 58 and is secured thereto by a plurality of circumferentially spaced bolts 66. The cover 64 is provided with a centrally positioned abutment head 68 projecting to the right therefrom and adapted to abuttingly engage the left end 29 of the axle 20 thereby limiting movement of the latter to the left. The head 68 also limits movement to the left of the sun gear 32 when the latter engages the snap ring 34. The wheel hub is provided with a plugged opening 67 for lubricant drainage purposes, and an opening 69 in the cover 64, threadedly receives a plug 69A which may be removed for supplying the outer end assembly 14 with lubricant. A seal 31A is disposed between the wheel hub 58 and the hub 46 of the member 44, and in cooperation with the seal 31 effectively prevents lubricant from leaving the outer end assembly 14.

Disposed intermediate the sun gear 32 and ring gear 56 are a plurality of circumferentially spaced planet gears one of which is shown at 70, which planet gears conventionally meshingly engage the sun gear and ring gear. Each of the planet gears 70 is rotatably mounted on a planet gear shaft 72 with a plurality of needle bearings 74 disposed therebetween to facilitate the rotation of the planet gears. The shafts 72 have the opposed ends thereof secured in aligned openings 76 formed in the opposed annular radially extending flange portions 78 and 80 of a planet gear carrier shown generally at 82. The flange portion 80 is disposed about and radially spaced from the abutting block 50 and spaced axially intermediate the planet gears 70 and flange 54 of the bell shaped member 38 while the flange portion 78 is disposed intermediate the planet gears 70 and the hub end cover 64 and spaced radially outwardly from the abutting head 68. An annular web 84 joins the flange portions 78 and 80 and is positioned radially intermediate the sun and ring gears 32 and 56 and is provided with a radially extending opening 86 therethrough at the position of each of the planet gears 70 to accommodate the latter.

The flange portion 78 extends radially beyond the web 84 and is provided with peripheral splines 88 which are splined with internal splines formed on the hub 58. The splines 88 and 90 are proportioned so that the carrier 82 may float radially relative to the hub 58 and so that relative axial movement may taken place therebetween while still insuring that the carrier 82 is drivingly connected to the hub 58 by means of the splines 88 and 90.

A shoulder 92 is formed on the hub end cover 64 and adapted to engage the left side of the carrier 82 and inhibit movement to the left thereof while a shoulder 94 is formed on the hub 58 to the right of the carrier 82 and adapted to engage the carrier thereby limiting movement to the right thereof. Accordingly, the planet gear carrier 82 is adapted for axial movement relative to the hub 58 which movement is limited by the engagement thereof with the shoulders 92 and 94.

Accordingly, axial and radial movement of the hub 58 relative to the housing 16 and combinations of such movements are not imposed upon the planetary gear set 33 since such relative movement will be accommodated by the spline connection at 88 and 90 between the carrier 82 and the hub 58. Thus when the hub 58 is loaded radially and/or axially, resulting in the urging thereof relative to the housing 16, and to the extent that tolerances and deflection of material allow relative movement and as the bearings 60 and 62 wear and allow such movement, the movement of the hub 58 relative to the housing 16 will not interfere with the meshing engagement of the members of the planetary gear set. Further, the axial and radial floating of the planet carrier 82, and thus of the planet gears 70 carried thereby allows the planet gears to assume a relationship relative to the ring gear 56 wherein the planet gears are equally loaded. Additionally, since the sun gear 32 is free to move both axially and radially with the axle shaft 20 and axially relative to the axle shaft the sun gear and the end 29 of the axle shaft will become centrally positioned by the sun gear's meshing engagement with the planet gears 70 and will be equally loaded thereby.

The wheel hub 58 is provided with an annular radially outwardly extending flange 100 which conventionally mounts a tire hub shown in phantom 102 and an annular brake drum 104 by means of a plurality of bolts 105. The brake drum 104 cooperates with a braking mechanism shown fragmentarily at 106 which is secured to the annular flanged member 44 by a plurality of bolts 108.

While only a single embodiment of this invention has been shown and described, it is readily apparent that many changes can be made therein without departing from the scope of this invention as defined in the following claims.

What is claimed is:

1. In a drive assembly for a vehicle, an axle shaft housing having an outer end, an axle shaft disposed in said housing for rotation relative thereto, a wheel hub in a ratio drive relationship, said gear set comprising a sun gear drivingly connected to the outer end of said axle shaft, a ring gear member disposed coaxially with said housing, a plurality of planetary gear means meshingly engaging said sun gear and said ring gear member and a planet carrier member drivingly connected to said planet gears means, one of said members being secured to said housing, driving means drivingly connecting the other of said members to said wheel hub for unitary rotation and relative radial float and mounting; means mounting said axle shaft and sun gear for radial and axial movement relative to the outer end of said housing whereby said sun gear is radially positioned by its meshing engagement with said planet gear means.

2. In a drive axle for a vehicle, an axle shaft housing having an outer end, an axle shaft extending through said housing and being rotatably mounted therein, the outer end of said axle shaft extending from the outer end of said housing, a hollow annular wheel hub rotatably mounted on the outer end of said housing and having at least the portion thereof extending outwardly beyond the outer end of said housing, a planetary gear set disposed within said wheel hub and drivingly connecting said axle shaft and said wheel hub, said gear set comprising a sun gear including means drivingly connecting the same to the end of said axle shaft for unitary rotation therewith, a ring gear member disposed coaxially with said sun gear and radially spaced therefrom, a plurality of planet gears disposed radially intermediate and in meshing engagement with said sun gear and ring gear member, and a planet carrier member rotatably mounting said planet gears for rotation about their axes, a peripheral axially extending spline formed on one of said members, an axially extending internal spline formed on said wheel hub and cooperably meshing with said peripheral spline and thereby connecting said one member and said wheel hub for unitary rotation, said peripheral and internal splines being dimensioned so that said one member can float radially relative to said wheel hub, and means connecting the other of said members to said housing in a non-rotating relationship.

3. In a drive axle assembly as defined in claim 2, said peripheral and internal splines being dimensioned so that said one member can move axially as well as float radially relative to said wheel hub.

4. In a drive assembly according to claim 2, said wheel hub includes a pair of axially spaced abutting means adapted to axially engage said one member, said internal and peripheral splines allowing relative axial movement between said one member and said wheel hub, and said abutting means being disposed in a relationship with said one member and axially spaced relative thereto in such a manner that limited axial movement may take place between said one member and said hub before said abutment means engages said carrier.

5. In a drive axle assembly for a vehicle, an axle shaft housing having an outer end, an axle shaft extending through said housing and rotatably mounted therein and extending from the outer end thereof, a wheel hub rotatably mounted on the outer end of said housing and having at least a portion thereof extending outwardly beyond the outer end of said housing, a planetary gear set disposed within said wheel hub and drivingly connecting said axle shaft and said wheel hub, said gear set comprising a sun gear including means drivingly connecting the same to said axle shaft for unitary rotation therewith, a ring gear disposed coaxially with said sun gear and including means securing the same against rotation to said housing, a plurality of planet gears disposed intermediate and in meshing engagement with said sun gear and ring gear, and a planet carrier rotatably mounting said planet gears for rotation about their axes while being rotatable unitarily with said planet gears about said sun gear, and driving means connecting said carrier to said wheel hub for unitary rotation and relative radial float.

6. In a drive axle assembly as defined in claim 5, said driving means being cooperative axially extending splines on said carrier and said wheel hub.

7. In a drive axle assembly as defined in claim 6 wherein said cooperating splines accommodate relative axial movement between said carrier and said wheel hub in addition to said radial float whereby said wheel hub and said planet carrier are drivingly connected for unitary rotation while being movable relative to each other both axially and radially.

8. In a drive axle for a vehicle, an axle shaft housing having an outer end, an axle shaft extending through said housing and radially spaced therefrom and being rotatably mounted therein, the outer end of said axle shaft extending from the outer end of said housing, a hollow annular wheel hub rotatably mounted on the outer end of said housing and having at least a portion thereof extending outwardly beyond the outer end of said housing, a hub end cover means secured to the outer end of said wheel hub and enclosing the same, a planetary gear set disposed within said wheel hub and drivingly connecting said axle shaft and said wheel hub, said gear set comprising a sun gear including spline means connecting said sun gear to the end of said axle shaft for unitary rotation therewith, a ring gear disposed coaxially with said sun gear and including means securing the same to said housing against rotation relative thereto, a plurality of planet gears disposed intermediate and in meshing engagement with said sun gear and ring gear, and a planet carrier member rotatably mounting said planet gears for rotation about their axis while being rotatable unitarily with said planet gears about said sun gear, a peripheral axially extending spline formed on said carrier, and an axially extending internal spline formed on said wheel hub and cooperably meshing with the said peripheral spline and thereby connecting said planet carrier and said wheel hub for unitary rotation, said peripheral and internal splines being dimensioned so that said carrier can float radially relative to said wheel hub.

9. In a drive assembly as defined in claim 8, said wheel hub includes a pair of axially spaced abutting means adapted to axially engage said planet carrier, said internal and peripheral splines allowing relative axial movement between said planet carrier and said wheel hub, and said abutting means being disposed in a relationship with said carrier and axially spaced relative thereto in such a manner that limited axial movement may take place between said carrier and said hub before said abutment means engages said carrier.

10. In a drive axle assembly as defined in claim 9 wherein means mounts said axle shaft for axial and radial float relative to the outer end of said housing, whereby the meshing engagement between said planet gears and said sun gear radially positions said sun gear.

11. In a drive axle assembly as defined in claim 10 wherein said spline means connecting said sun gear to said axle shaft allows said sun gear to move axially relative to said axle shaft.

12. In a drive axle assembly for a vehicle, an axle housing having an outer end and a longitudinally extending axis, an axle shaft disposed in said housing for rotation relative thereto, a wheel hub including means mounting the same on the outer end of said housing for rotation relative thereto, a planetary gear set drivingly connecting said axle shaft and said wheel hub in a ratio drive relationship, said gear set comprising a sun gear member disposed coaxially with said axle shaft, a ring gear member disposed coaxially with said sun gear, a plurality of planetary gear means meshingly engaging both of said sun gear member and said ring gear member, a planetary carrier member disposed coaxially with said sun gear and including means mounting said planet gear means to said carrier member whereby each of said gear means is rotatably mounted about its own axis relative to said carrier member while said carrier member and said gear means are secured for unitary movement relative to said longitudinal axis, means securing one of said members to said axle shaft for unitary rotation therewith, means securing a second of said members to said housing in a rotatable stationary relationship relative to said one member and driving means drivingly connecting the third of said members to said wheel hub for unitary rotation and relative axial movement and radial float, said wheel hub including a first and a second portion, said first portion axially overlapping said housing and rotatably mounted relative thereto, said second portion being radially enlarged and extending axially outwardly from said first portion, and said planetary gear set being disposed in said second portion of said wheel hub and peripherally surrounded by the same.

References Cited
UNITED STATES PATENTS

| | | | |
|---|---|---|---|
| 1,464,887 | 8/1923 | Starr | 180—43 |
| 1,678,798 | 7/1928 | Asprooth | 74—801 |
| 1,768,225 | 6/1930 | Whitney | 74—801 |
| 2,424,578 | 7/1947 | Mortag | 180—43 |
| 2,703,021 | 3/1955 | Stoeckicht | 74—801 X |
| 2,768,698 | 10/1956 | Fabian | 74—801 X |
| 2,802,542 | 8/1957 | Gerst | 180—43 |
| 2,956,451 | 10/1960 | Bowman | 74—410 X |
| 2,998,735 | 9/1961 | Elffs | 74—801 |
| 3,011,365 | 12/1961 | Stoekicht | 74—801 |
| 3,221,832 | 12/1965 | Holmstrom | 74—801 |

ROBERT A. O'LEARY, *Primary Examiner.*

DAVID J. WILLIAMOWSKY, DONLEY J. STOCKING, *Examiners.*

J. R. BENEFIEL, A. T. McKEON, *Assistant Examiners.*